G. H. Aylworth,
Hay Press.
Nº 64,828.         Patented May 21, 1867.

Witnesses:
P. T. Dodge
Alex Mahon

Inventor:
C. H. Aylworth
By his Attys
Dodge + Munn

United States Patent Office.

GEORGE H. AYLWORTH, OF BRIGHTON, ILLINOIS.

Letters Patent No. 64,828, dated May 21, 1867.

IMPROVEMENT IN HAY-PRESS.

*The Schedule referred to in these Letters Patent and making part of the same.*

TO ALL WHOM IT MAY CONCERN:

Be it known that I, G. H. AYLWORTH, of Brighton, in the county of Macoupin, and State of Illinois, have invented certain new and useful improvements for Pressing and Baling Hay; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it, and the manner of its operation.

Figure 1:
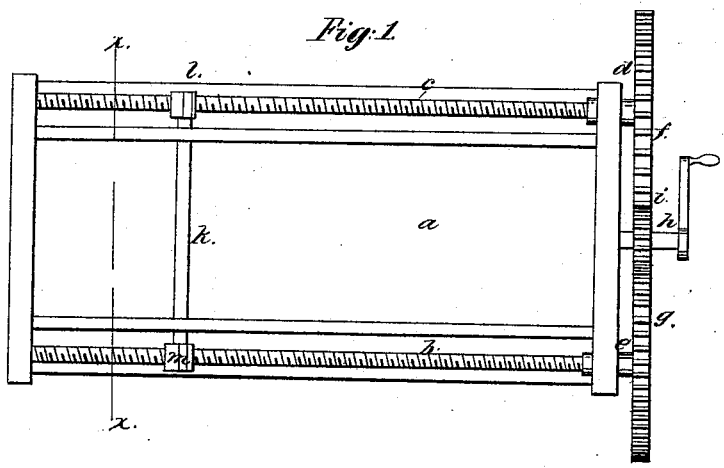
Figure 1 represents a top plan view.
Figure 2:
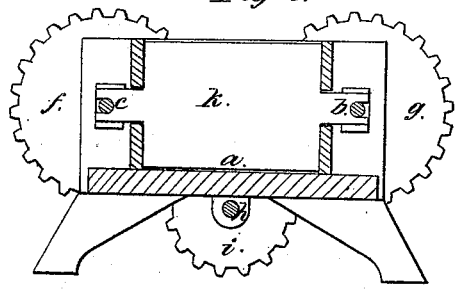
Figure 2 represents a transverse vertical section on line $x\ x$, fig. 1.

I first construct a light oblong frame, $a$, in shape similar to a wagon-box frame, leaving openings extending along its sides nearly its entire length. Immediately opposite these openings I place two shafts, $b\ c$, one opposite each opening, and passing from end to end and through each end of the frame $a$. Upon each of these shafts I cut a screw-thread, and to their ends $d\ e$ I attach cog-wheels $f\ g$. Under the bottom of the frame I place another shaft, $h$, extending from end to end of the frame, and projecting sufficiently far to place upon it a pinion, $i$, so that it may work in the cog-wheels $f\ g$, and also to have attached to it an arm for the application of the motive power. I then make a follower or sliding partition, $k$, and so construct it that a portion of each end will pass through the openings in the sides of the frame. These ends I attach to nuts $l\ m$, which are placed upon the screws $b\ c$.

In operating my press, I place the sliding partition $k$ at one end and fill the other with hay, then, by means of a horse or other motive power attached to the shaft $h$, the cog-wheels $f$ and $g$ are turned, and with them the screws $b\ c$. As the screws turn the nuts $l$ and $m$ are moved, and with them the sliding partition $k$, which presses the hay into a compact bale. While this bale is being pressed I put hay into the other end, which is ready to be pressed as soon as the first bale is finished. This I do by simply reversing the motion of the horse or motive power, and thus causing the sliding partition to move in an opposite direction. And in this way, by filling first one end and then the other, I am enabled to bale hay cheaply and rapidly. This machine I make sufficiently light as to be portable, so that it may be easily carried into the field, to the hay-stack, or wherever desired. It is simple, cheap, convenient, and well suited for purpose designed, a "portable hay-press."

Having thus described my invention, what I claim, is—

I claim a hay-press consisting of the box $a$ and the sliding partition $k$, operated by means of the screws $c\ b$, the whole constructed and arranged as herein shown and described.

GEORGE H. AYLWORTH.

Witnesses:
  WILLIAM C. MERRILL,
  O. A. CHASE.